(12) United States Patent
Pickering et al.

(10) Patent No.: US 7,039,874 B2
(45) Date of Patent: May 2, 2006

(54) INTERFACE FOR MODIFYING DATA FIELDS IN A MARK-UP LANGUAGE ENVIRONMENT

(75) Inventors: Craig Pickering, Alpharetta, GA (US); Gregory Pickering, Atlanta, GA (US)

(73) Assignee: Mirant Intellectual Asset Management and Marketing, Atlanta, GA (US)

(*) Notice: Subject to any disclaimer, the term of this patent is extended or adjusted under 35 U.S.C. 154(b) by 203 days.

(21) Appl. No.: 10/342,026

(22) Filed: Jan. 14, 2003

(65) Prior Publication Data

US 2004/0135807 A1 Jul. 15, 2004

(51) Int. Cl.
*G06F 3/00* (2006.01)
(52) U.S. Cl. .............. 715/760; 715/503; 715/504; 715/708; 715/780; 715/856; 715/862
(58) Field of Classification Search ................ 715/760, 715/711, 738, 751, 764, 769, 770, 503, 504, 715/708, 780, 856, 862
See application file for complete search history.

(56) References Cited

U.S. PATENT DOCUMENTS

| 6,691,281 | B1* | 2/2004 | Sorge et al. ............. 715/503 |
| 6,802,041 | B1* | 10/2004 | Rehm .................. 715/500.1 |
| 2002/0099947 | A1* | 7/2002 | Evans .................... 713/193 |
| 2003/0110191 | A1* | 6/2003 | Handsaker et al. ........ 707/503 |

OTHER PUBLICATIONS

Ulrich, Laurie. "SAMS Teach Yourself Office 2000 in 21 Days". Sams Publishing, 1999. pp. 523-538.*

* cited by examiner

*Primary Examiner*—Cao (Kevin) Nguyen
*Assistant Examiner*—Michael Roswell
(74) *Attorney, Agent, or Firm*—Smith Frohwein Tempel Greenlee Blaha LLC; Gregory Scott Smith (57) ABSTRACT

A method for modifying a data field is described, illustrated and claimed. The novel system and method allows for quick and efficient modification of all or a portion of a plurality of data fields, while preserving the ability to modify individual areas. An action is associated with a rule for modification of objects in a specific manner. When that action is performed, every object defined by the rule is modified. The method allows for modification of multiple groups in the same manner, and also allows for modification of individual areas.

2 Claims, 7 Drawing Sheets

| 415 | 1 | Book |
|---|---|---|
| 420 | 2 | Apple |
| 425 | 3 | Bird |
| 430 | 4 | Chicken |

| Car ← 402 |
| Orange |
| Dog |
| Steak |

▽ Delete — 405

| 415 | 1 | Book | Car ← 402 |
|---|---|---|---|
| 420 | 2 | Apple | Orange |
| 425 | 3 | Bird | Dog |
| 430 | 4 | Chicken | Steak |

Fig. 4C

▽ Delete — 405

| 420 | 1 | Apple | Orange ← 402 |
|---|---|---|---|
| 425 | 2 | Bird | Dog |
| 430 | 3 | Chicken | Steak |

Fig. 4D

▽ Delete — 405

| 420 | 1 | Apple | Orange |
|---|---|---|---|
| 425 | 2 | Bird | Dog ← 402 |
| 430 | 3 | Chicken | Steak |

|   |   |        |
|---|---|--------|
| 420 | 1 | Apple  |
| 430 | 2 | Chicken |

→ 402 Steak / Orange

Fig. 4F

|   |   |        |
|---|---|--------|
| 420 | 1 | Apple  |
| 425 | 2 | Bird   |
| 430 | 3 | Chicken |

→ 402 Dog / Orange, Steak

◁ Delete  405

INTERFACE FOR MODIFYING DATA FIELDS IN A MARK-UP LANGUAGE ENVIRONMENT

TECHNICAL FIELD

The present invention relates to control interfaces for computer programs and, more particularly to a method of modifying or otherwise invoking an operation on multiple data fields displayed by a computer device in response to simple actions performed by a user or process.

BACKGROUND OF THE INVENTION

A database is one or more large structured sets of persistent data, usually associated with software to update and query the data. A simple database might be a single file containing many records, each of which contains the same set of fields where each field is a certain fixed width. A record is an ordered set of data fields, usually stored contiguously. In viewing of a database, the record-s are oftentimes displayed in "rows" and/or "columns." The contents within data fields are typically written, re-written, copied, deleted, cut, pasted, or modified in some other manner numerous times. Furthermore, a field is an area of a database record, or graphical user interface forms, into which a particular item of data is entered. Fields are presented to operators by way of a computer display or screen. A field, in effect, allows a user or operator to enter data into a database to be displayed by the computer.

In business today, databases are becoming more widely used and depended upon. Databases are used to store, sort and recall massive amounts of information for display on a computer. In addition, databases are used to update stored information regularly. Thus, databases must be capable of modifying the massive amounts of information quickly and easily.

Modifying information within a database is performed by modifying the contents of the data fields within a particular database. A typical method of modifying information within a data fields is accomplished by selecting a data field to be modified with a mouse pointer, then performing a particular operation thereto, however, this can become time consuming in a rather large database. Thus, methods for modifying a group of data fields have become commonplace. A typical method of modifying a group of data fields is by selecting a data field to be modified as above, then selecting additional individual data fields by performing a combination of actions (i.e. holding down the Ctrl key and clicking a mouse button over the desired data fields, or holding down the Shift key and depressing an arrow key, etc.) to define the group, then finally, performing the desired operation thereto. Another typically method used to modify a group of data fields is by clicking on an icon that represents an entire record (i.e. a row or column of data fields), then performing a particular operation thereto. These methods are sufficient for modifying a single data field or even a row or column of data fields; however, the methods are not efficient for modifying a group of data fields within a record, or within a database.

What is needed, therefore, is a method and system for quickly and efficiently modifying groups of data fields with simple actions.

SUMMARY OF THE INVENTION

In general, the present invention can be described as a novel system and method for quickly and efficiently modifying or otherwise invoking an operation upon or related to, all or a portion of a plurality of data fields. More specifically, performing an action (i.e. right clicking or shift clicking a mouse, depressing Alt "A" on the keyboard, etc.) associated with a rule, invokes an operation on all or a portion of the plurality of data fields dictated by the rule. The operation can include any of a variety of operations, such as, deleting or copying the data fields, selecting or deselecting the data fields, updating or refreshing the data fields, changing the attributes of the data fields or the like. Using the copying example, a user or process performs an action (i.e. right clicking or shift clicking a mouse, depressing Alt "A" on the keyboard, etc.) in or near a data field. Next, a selector, or icon, is displayed defining the type of operation to be performed. Next, the user or process actuates (i.e. left clicking a mouse, depressing Enter, etc.) the icon. Next, the rule is applied to a selection group consisting of at least one of the plurality of data fields, then the data field contents are copied into the content areas of the selection group. In addition, the face of the selection group may be modified to reflect the performance of such operation, for instance the face may then be shown highlighted, to indicate that an operation has been performed. At that point, if the user wishes, he can repeat the process with the same selection group using a different data field or, keep the same data field and select a different selection group to copy the data into. Furthermore, a user may select an individual data field within the plurality of data fields to copy data into.

BRIEF DESCRIPTION OF THE DRAWINGS

Other aspects, advantages and novel features of the invention will become more apparent from the following detailed description of exemplary embodiments of the invention when considered in conjunction with the accompanying drawings wherein.

DETAILED DESCRIPTION

In general, the present invention can be described as a novel system and method for quickly and efficiently modifying or otherwise invoking an operation upon or related to, all or a portion of a plurality of data fields displayed by a computer device in response to simple actions performed by a user or process. Some examples of data fields include, but are not limited to: graphical user interface objects, data objects, textual objects, etc. As with the exemplary embodiments below, these examples are for illustrative purposes only and, a person skilled in the art will construe them broadly.

Referring now to the figures, in which like numerals refer to like elements throughout the several views, exemplary embodiments of the present invention are described. Throughout the detailed description, reference will be made to the operation of the present invention when embodied within a computing device within a mark-up language environment. Computing devices may include, but are not limited to, personal computers, mainframe computers, servers, and any other device capable of executing the software associated with the present invention. It should be understood that the features and aspects of the present invention can be ported into a variety of systems and system/network configurations and any examples provided within this description are for illustrative purposes only.

Figure 1:
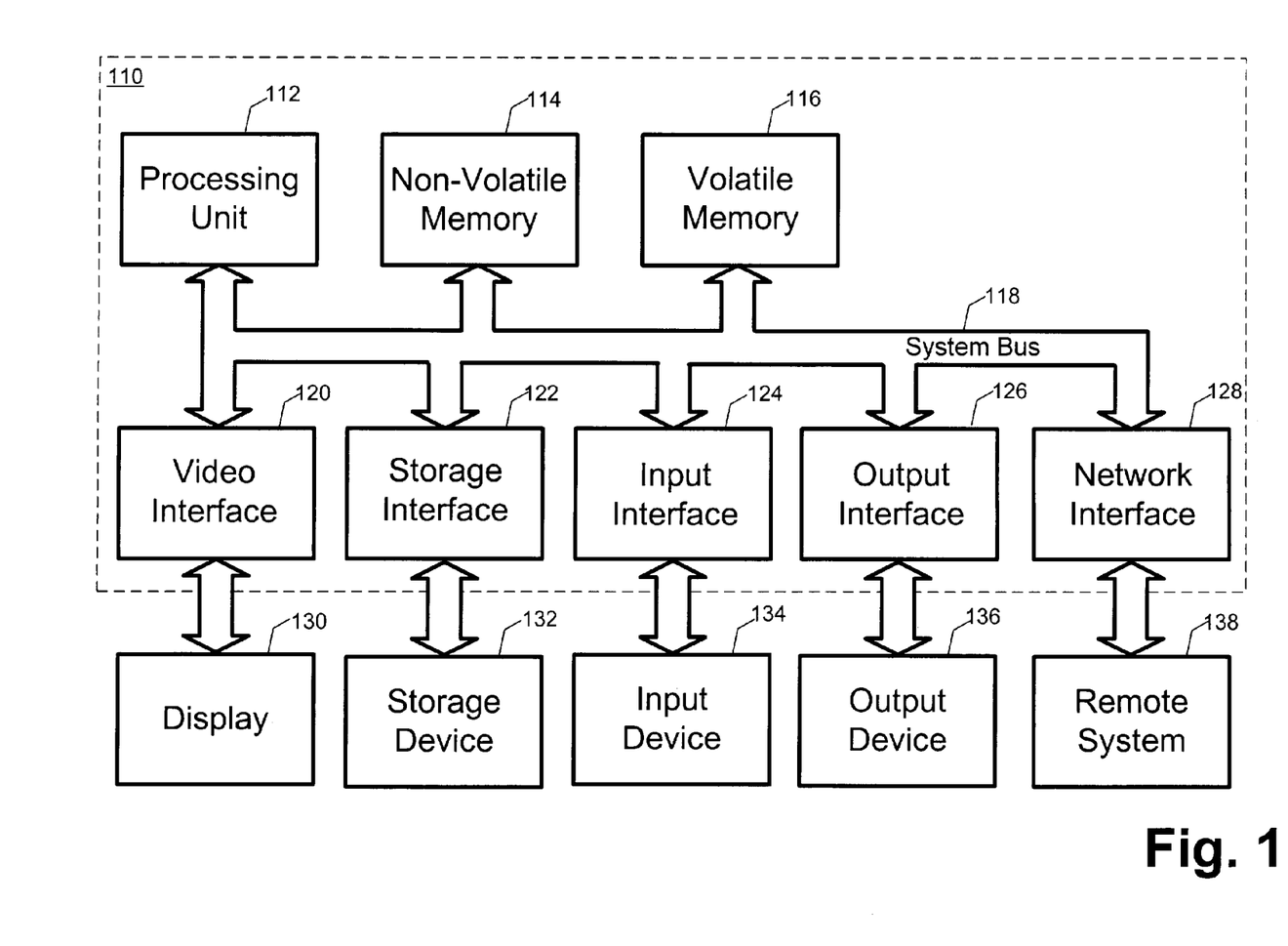
FIG. 1 is a system diagram that illustrates an exemplary environment suitable for implementing various embodiments of the present invention.

In conjunction with FIG. 1, the components of a general platform on to which aspects of the present invention can be implemented are described. Next, the components of a general application into which aspects of the present invention are incorporated are described in conjunction with FIG. 2. Finally, various operations of exemplary embodiments of the present invention are described in conjunction with FIGS. 3A–B, 4A–F and 5A–F.

Exemplary Environment

FIG. 1 is a system diagram that illustrates an exemplary environment suitable for implementing various embodiments of the present invention. FIG. 1 and the following discussion provides a general overview of a platform onto which the invention, or portions thereof, may be integrated, implemented and/or executed. Although in the context of the exemplary environment the invention will be described as consisting of instructions within a software program being executed by a processing unit, those skilled in the art will understand that portions of the invention, or the entire invention itself may also be implemented by using hardware components, state machines, or a combination of any of these techniques. In addition, a software program implementing an embodiment of the invention may run as a stand-alone program or as a software module, routine, or function call, operating in conjunction with an operating system, another program, system call, interrupt routine, library routine, or the like. The term program module will be used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 1 may take on many forms and may be directed towards performing a variety of functions. Generally, the system illustrated in FIG. 1 may be any system that includes a computer processor. Examples of such forms and functions include, but are not limited to, personal computers, hand-held devices such a personal data assistants, note-book computers, lap-top computers, mainframe computers, servers and a variety of other applications, each of which may serve as an exemplary environment for embodiments of the present invention.

The exemplary system illustrated in FIG. 1 includes a computing device 110 that is made up of various components including, but not limited to a processing unit 112, non-volatile memory 114, volatile memory 116, and a system bus 118 that couples the non-volatile memory 114 and volatile memory 116 to the processing unit 112. The non-volatile memory 114 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, and battery backed random access memory (RAM). The non-volatile memory 114 provides storage for power on and reset routines (bootstrap routines) that are invoked upon applying power or resetting the computing device 110. In some configurations the non-volatile memory 114 provides the basic input/output system (BIOS) routines that are utilized to perform the transfer of information between elements within the various components of the computing device 110.

The volatile memory 116 may include, but is not limited to, a variety of memory types and devices including, but not limited to, random access memory (RAM), dynamic random access memory (DRAM), FLASH memory, EEPROM, bubble memory, registers, or the like. The volatile memory 116 provides temporary storage for routines, modules, functions, macros, data, etc. that are being or may be executed by, or are being accessed or modified by the processing unit 112. In general, the distinction between non-volatile memory 114 and volatile memory 116 is that when power is removed from the computing device 110 and then reapplied, the contents of the non-volatile memory 114 remain in tact, whereas the contents of the volatile memory 116 are lost, corrupted, or erased.

The computing device 110 may access one or more external display devices 130 such as a CRT monitor, LCD panel, LED panel, electro-luminescent panel, or other display device, for the purpose of providing information or computing results to a user. In some embodiments, the external display device 130 may actually be incorporated into the product itself. The processing unit 112 interfaces to each display device 130 through a video interface 120 coupled to the processing unit 110 over the system bus 118.

The computing device 110 may interface with one or more storage devices such as a hard disk drive, a compact disk drive, a floppy disk drive, a RAM drive or other memory drive, for the purpose of storing information, program data or programs. The storage device 132 is accessed through a storage interface 122 that connects to the system bus 118.

The computing device 110 may send output information, in addition to the display 130, to one or more output devices 136 such as a speaker, modem, printer, plotter, facsimile machine, RF or infrared transmitter, computer or any other of a variety of devices that can be controlled by the computing device 110. The processing unit 112 interfaces to each output device 136 through an output interface 126 coupled to the processing unit 112 over the system bus 118. The output interface 126 may include one or more of a variety of interfaces, including but not limited to, cable modems, DLS, T1, V series modems, an RS-232 serial port interface or other serial port interface, a parallel port interface, a universal serial bus (USB), a general purpose interface bus (GPIB), an optical interface such as infrared or IRDA, an RF or wireless interface such as Bluetooth, or other interface.

The computing device 110 may receive input or commands from one or more input devices 134 such as a keyboard, pointing device, mouse, modem, RF or infrared receiver, microphone, joystick, track ball, light pen, game pad, scanner, camera, computer or the like. The processing unit 112 interfaces to each input device 134 through an input interface 124 coupled to the processing unit 112 over the system bus 118. The input interface 124 may include one or more of a variety of interfaces, including but not limited to, cable modems, DSL, T1, V series modems, an RS-232 serial port interface or other serial port interface, a parallel port interface, a universal serial bus (USB), a general purpose interface bus (GPIB), an optical interface such as infrared or IrDA, an RF or wireless interface such as Bluetooth, or other interface.

It will be appreciated that program modules implementing various embodiments of the present invention may be stored in the non-volatile memory 114, the volatile memory 116, or in a remote memory storage device accessible through the output interface 122 and the input interface 124. The program modules may include an operating system, application programs, other program modules and program data. The processing unit 112 may access various portions of the program modules in response to the various instructions contained therein, as well as under the direction of events occurring or being received over the input interface 124.

The computing device 110 may interface with one or more remote systems 138, such as a server or client, through a network interface 128. In a networked configuration, some or all of the components of the present invention may be distributed and operate on one or more remote systems 138. The present invention may be embodied in a web application that is assessable on a remote system 138 through a browser type application running on processing unit 112.

Components of a Typical Screen

Figure 2:
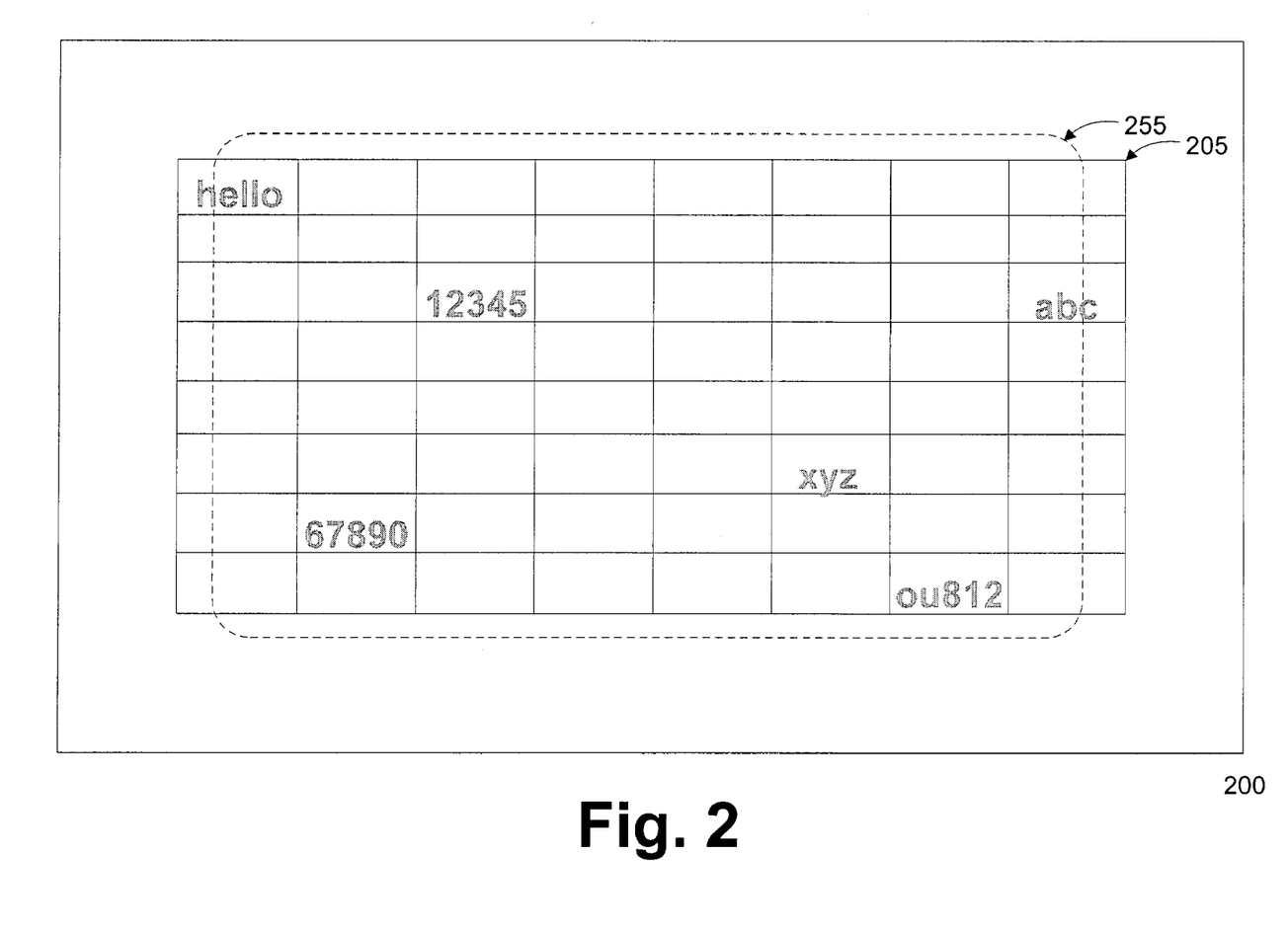
FIG. 2 is an exemplary application utilizing an embodiment of the present invention.

FIG. 2 is a "screen shot" 200 that illustrates an exemplary embodiment of the present invention. Generally, the screen shot illustrated in FIG. 2 may be any screen that includes data fields. Examples of such forms and functions that a screen may be displayed on include, but are not limited to, personal computers, hand-held devices such a personal data assistants, note-book computers, lap-top computers, mainframe computers, servers and a variety of other applications, each of which may serve as an exemplary environment for embodiments of the present invention.

More particularly, the screen shot 200 in FIG. 2 includes a plurality of data fields 205 with associated data 255. The associated data 255 can be any type of data or even a graphical element. In general, the screen shot is shown to be formatted as a two-dimensional table with rows and columns. However, the screen shot is not limited to such a configuration and the present invention anticipates other configurations as well. In addition, the present invention can operate in conjunction with screen shots provided by applications running on stand alone computers and/or terminals, applications running on various operating systems, and within web browser or mark-up language type interfaces.

Operations of Exemplary Embodiments

The exemplary embodiments of the present invention will now be discussed with reference to FIGS. 3–5.

In general, the present invention can be described as a novel system and method for quickly and efficiently modifying or otherwise invoking an operation upon or related to, all or a portion of a plurality of data fields displayed by a mark-up language computer application program in response to simple actions performed by a user or process. For illustrative purposes, the present invention will be described using logically-defined groups of graphical user interface data fields, these examples are for illustrative purposes only and, a person skilled in the art will construe them broadly.

The present invention illustrates a mark-up language software application that presents graphical data fields that have been physically and logically grouped by a programmer writing the software application. The graphical data field used may be a data field, or it may be some other type of graphical data field used to represent the function described herein as being associated with a data field.

Figure 3:
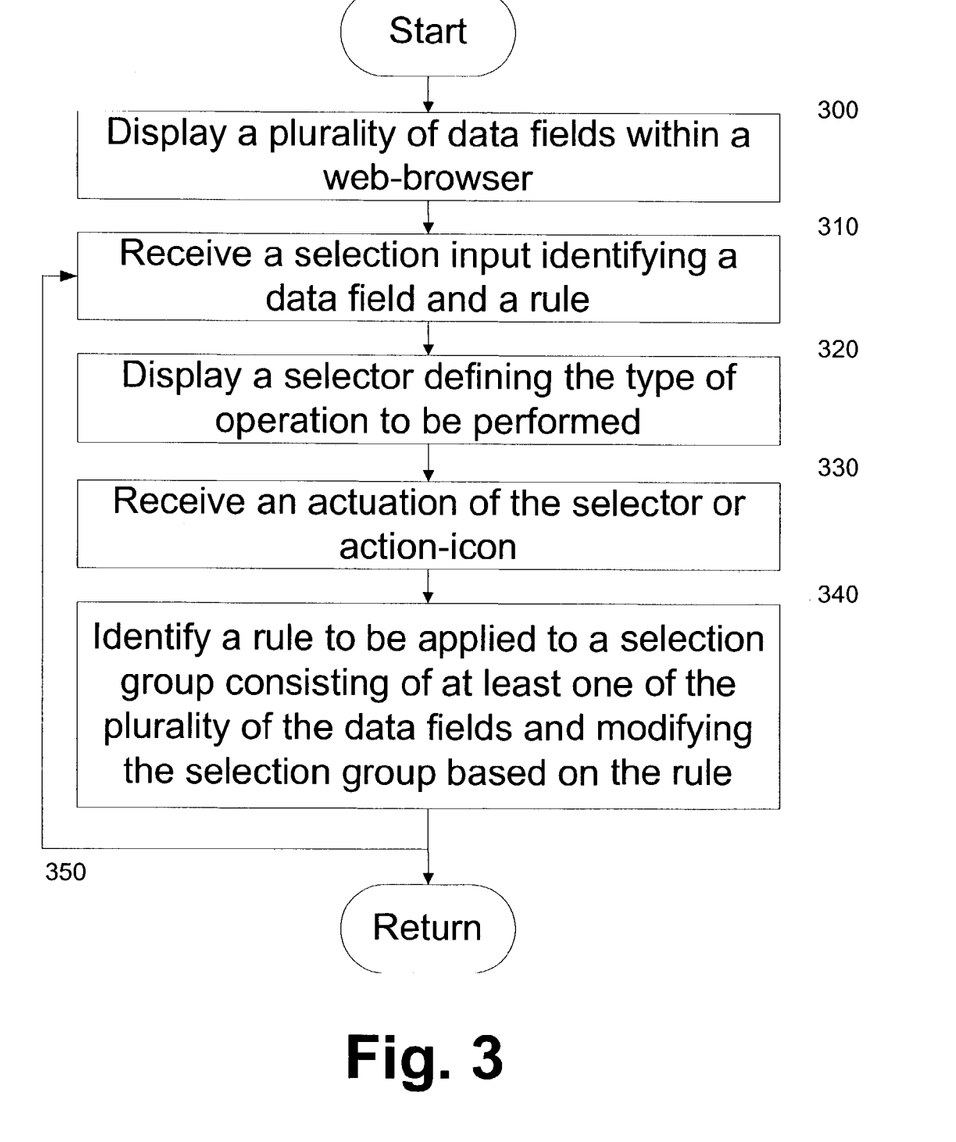
FIG. 3 is a flow diagram illustrating the method of an exemplary embodiment of the present invention as perceived by a computing device.

FIG. 3 illustrates the logical steps performed by a mark-up language computer application embodying the present invention. It will be obvious to one skilled in the art how to incorporate the processes of FIG. 3 into a larger process for handling general interactions with a graphical user interface.

The process begins with the computer displaying a plurality of data fields at Step 300. Next, the computer receives a selection input from a user or another process at Step 310. The input identifies a particular data field of the plurality of data fields and a rule to be applied (i.e. copy, delete, highlight, etc.). The inputs or actions performed by the user, process or an application program may include, but are not limited to, the following types of actions: double clicking a mouse or equivalent button while the mouse pointer is over a particular data field, clicking a mouse or equivalent button while the Shift key is being held down, clicking a mouse or equivalent button while the Ctrl key is held down, pressing and holding a mouse or equivalent button for a certain period of time, triple clicking a mouse or equivalent button, clicking a mouse or equivalent button while the Alt key is being held down, depressing the "A" key or equivalent key while the Shift key is being held down, depressing the "A" key or equivalent key while the Ctrl key is being held down, etc. After the selection input is received, processing continues at Step 320.

At Step 320, the computer displays a selector, or action-icon, within or near the data field. The selector defines the type of operation to be performed on the plurality of data fields and may give a visual indication of the available operation. The selector can be represented in any of a variety of methods and the present invention is not limited to any particular method. In one embodiment, the selector can be a textual tag located in proximity to the group of data fields as indicated by the delete selector 405 in FIG. 4B. The selectors define different types of operations and may include, but are not limited to: a copy selector, a delete selector, a highlight selector, a select selector, a deselect selector, an update selector, a refresh selector, an attribute selector, etc. The type of selector is generally determined by the input or action performed by the user, process or an application program. Determining the appropriate type of selector can be performed in several manners. For instance, a copy selector may be associated with clicking a mouse or equivalent button while the Shift key is being held down, or with clicking a mouse or equivalent button while the Ctrl key is being held down. Or, alternatively, a delete selector may be associated with clicking a mouse or equivalent button while the Shift key is being held down, or with clicking a mouse or equivalent button while the Ctrl key is being held down. After the selector is displayed, processing continues at Step 330.

In an exemplary embodiment, the action-icon may be moved without clicking on a data field. In this embodiment, a logical tray has selection points located theron. The selection points are associated with a particular location and data field within the display. When a location on the tray is selected (i.e. left click, Enter, etc.), the action-icon moves to that associated location and is identified with the particular data field. In another exemplary embodiment, the action-icon may be moved using a combination of actions. The actions may be performed by a user, process or an application program and may include, but are not limited to, the following types of actions: left clicking a mouse button and dragging across the display; right clicking a mouse button, depressing the Shift key and dragging across the display; left clicking a mouse button, depressing the Alt key and dragging across the display; etc.

At Step 330, the computer receives an actuation (i.e. left click, Enter, etc.) of the selector, or action-icon, from a user or another process. Processing then continues at step 340.

At step 340, based on the actuation of the selector, or action-icon, the computer identifies a rule to be applied. The rule generally involves associating the operation with the appropriate data fields, defined by a selection group consisting of at least one of the plurality of data fields. The rule is generally determined based on the selection indicator, the action performed by the user, process or an application program or a combination of both. Determining the appropriate rule can be performed in several manners. Typically, the function to be performed (i.e., copy, delete, reformat, modify, lock, clear, reset, etc.) is determined by the input received and may be indicated by the displayed selector. The selection group which the rule is to be applied can be based on user/process actions in actuating the selector, can be based on the location of the pointer, can be based on an options selected function or can simply be hard coded into the system. Some of the variations can include the following parameters—select the data fields: below the data field under the mouse pointer; the data fields above the data field under the mouse pointer; one data field below the data field under the mouse pointer; one data field above the data field under the mouse pointer; the data fields in a range either above, below or both from the data field under the mouse pointer; all data fields that contain the same contents, or share some other commonality with the data field under the mouse pointer; the data fields adjacent to the data field under the mouse pointer; the data fields to the left or right of the data field under the mouse pointer; etc. It should be noted that the appropriate data fields could be inclusive or exclusive of the data field under the mouse pointer.

Basing the selection of the selection group on the location of the mouse pointer can be accomplished by assigning various selection criteria to the various locations of the mouse pointer. For instance, if the mouse pointer is located at the far right edge of the data field, the rule can be applied to the data fields to the left of the current data field (inclusive or exclusive). If the mouse pointer is in the middle of the data field, the rule can be applied to the data fields in two directions (up and down or left and right), four directions (up, down, left and right) or omni-directional. If the mouse pointer is in the upper right corner of the data field, the rule may be applied to the data fields extending diagonally from the present data field. Those skilled in the art will realize that several variations of this technique can be applied and the present invention is not limited to any particular technique.

Once the rule to be applied and the data fields to apply the rule to have been identified, the computer modifies the status of the selection group in accordance with the rule. Some examples of modifications to data fields include, but are not limited to: copy the data fields below the data field under or near the mouse pointer; delete the data fields above the data field under or near the mouse pointer; highlight one data field below the data field under or near the mouse pointer; select one data field above the data field under or near the mouse pointer; deselect the data fields in a range either above, below or both from the data field under or near the mouse pointer; update all data fields that contain the same contents, or share some other commonality with the data field under or near the mouse pointer; refresh the data fields adjacent to the data field under or near the mouse pointer; change an attribute to the data fields to the left or right of the data field under or near the mouse pointer; etc.

Finally, the computer returns, at Step 350, to Step 310 ready to receive an input from a user or another process. The return Step 350 can be performed multiple times.

The flexibility of the present invention allows for the mapping of multiple data fields to multiple rules. Thus, the speed and efficiency of applying certain operations to groups of data fields can be customized depending on the application. In any particular embodiment of the present invention, one or more data fields can be mapped to one or more rules using a one to one mapping, many to one mapping or one to many mapping.

Figure 4A:
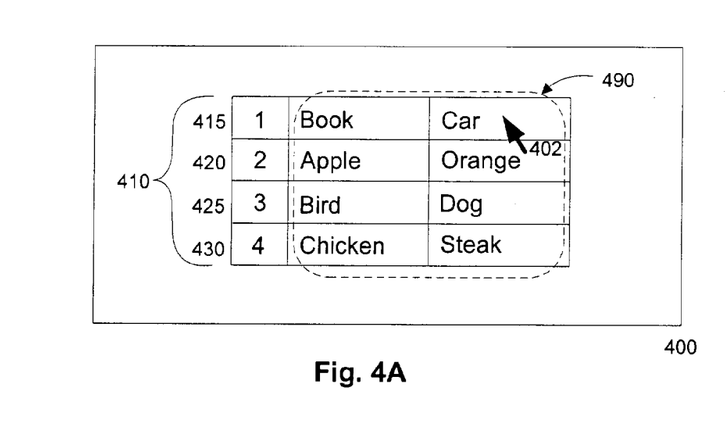
FIGS. 4A–F illustrate various aspects in which the objects used by the present invention may be depicted on a graphical user interface display of a computer workstation.
Figure 4B:
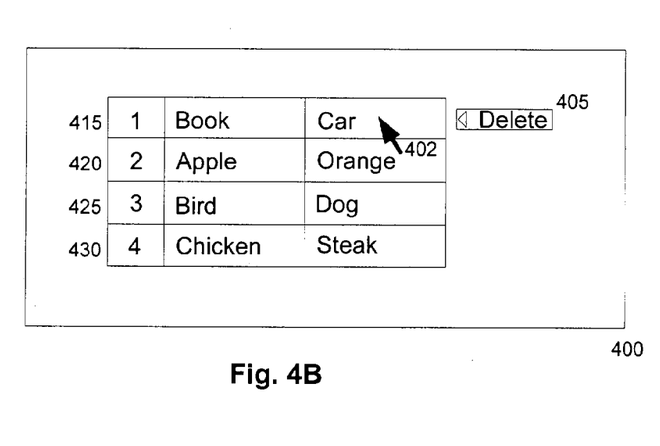
Figure 4C:
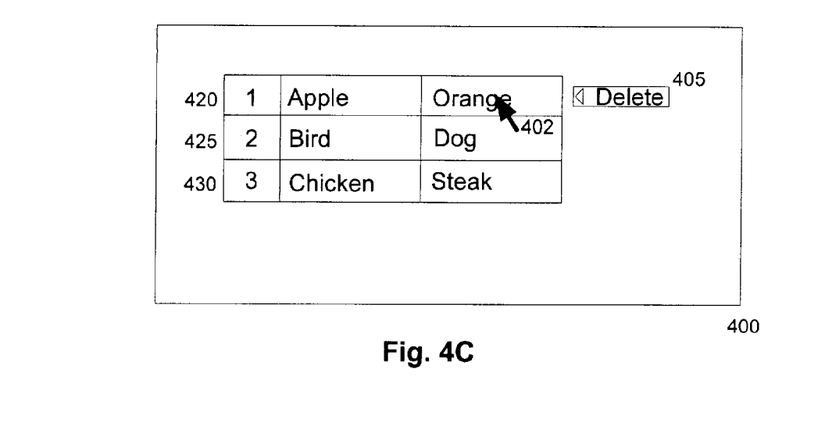

FIGS. 4A–F are representative screen shots illustrating several of the aforementioned actions and rules. The inputs and action-icons are only for illustrative purposes and should not limit the scope of the patent in any manner. In addition, the association of the action/rule combination, as well as the actions and rules themselves are only for illustrative purposes and one skilled will realize that other potential expansions of the present invention are currently available. In FIG. 4A, a screen shot includes data fields 410 in a numbered list format with each of the data fields including a text entry 490. The data fields 410 are defined as rows of individual data fields 415–430. A mouse pointer 402 is shown as being located over data field 415. Upon performing an action, such as depressing the shift key and clicking on the mouse button, a particular data field and a rule are identified (i.e. data field 415 and delete). The results of this operation are shown in FIG. 4B with a delete action-icon 405 displayed next to data field 415. Next, upon actuating the icon such as depressing the Enter key, the rule identified is applied to a selection group of data field 415, in this example, the delete rule. The results of this operation are shown in FIG. 4C with data field 415 deleted and data fields 420–430 remaining with renumbered rows. Note that in this example the action-icon 405 remains displayed, however, in other embodiments it can be automatically removed from the display upon the performance of the action or can be removed after a delay.

Figure 4D:
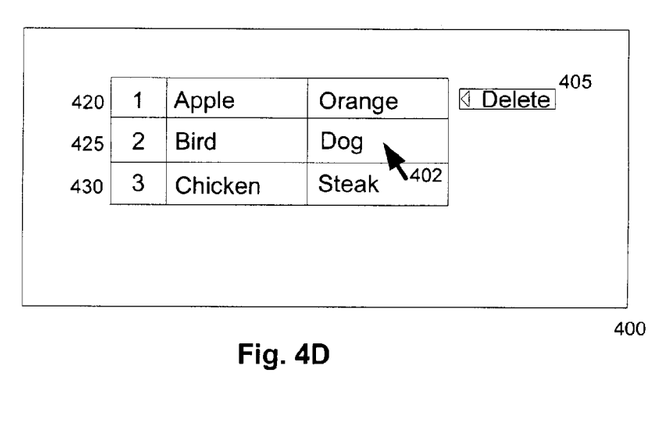
Figure 4E:
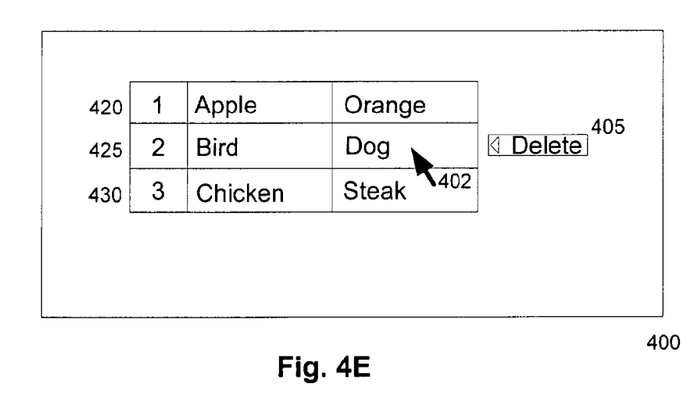
Figure 4F:
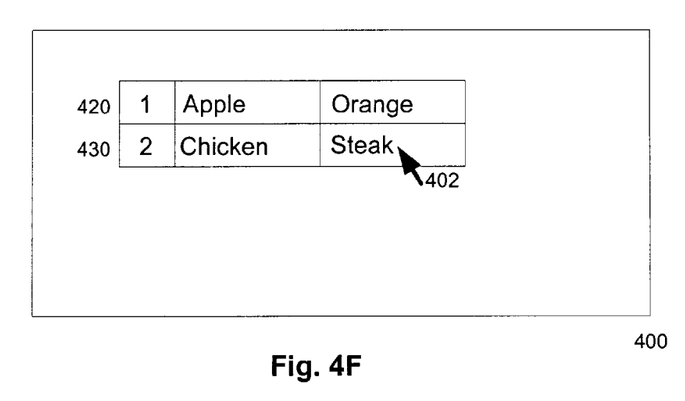

FIG. 4D shows another example. In this example, a mouse pointer 402 is located over data field 425 and delete action icon 405 has been previously selected. Upon performing an action such as depressing the Ctrl key and clicking mouse button, a particular data field and a rule are identified (i.e. data field 425 and delete). The results of this operation are illustrated in FIG. 4E with the delete selector 405 displayed next to data field 425. Next, upon actuating the icon such as depressing the Enter key, the rule identified is applied to a selection group of data field 425, in this example, the delete rule. The results of this operation are shown in FIG. 4F with data field 425 deleted and data fields 420 and 430 remaining with renumbered rows. Note that in this example the action-icon 405 is removed, however, it can be displayed after the operation is performed.

Figure 5A:
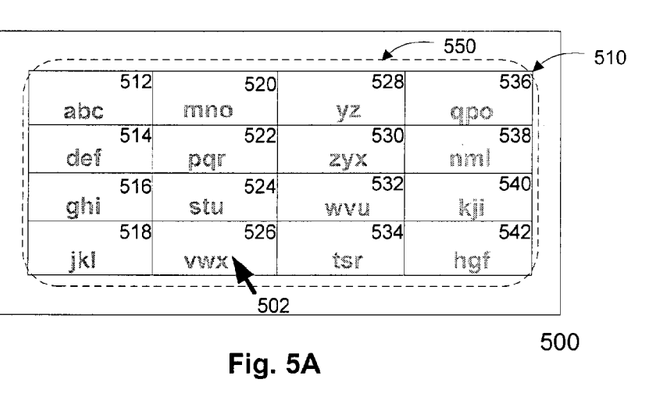
FIGS. 5A–F illustrate various aspects in which the objects used by the present invention may be depicted on a graphical user interface display of a computer workstation.
Figure 5B:
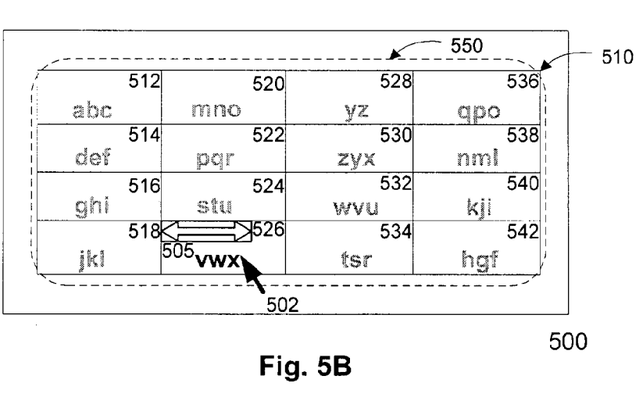
Figure 5C:
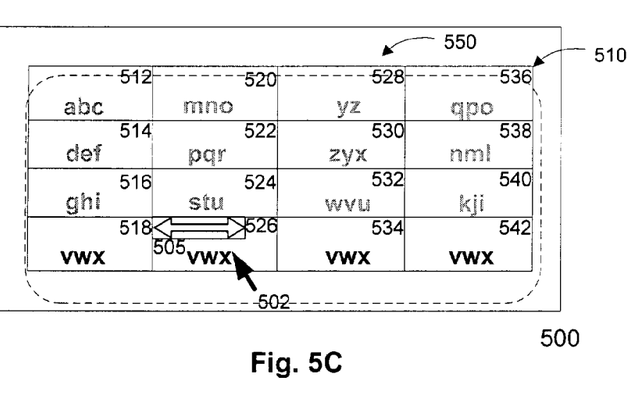

FIGS. 5A–F are representative screen shots illustrating several of the aforementioned actions and rules. The inputs and action-icons are only for illustrative purposes and one skilled in the art understand that the present invention should not be limited to any particular. In addition, the association of the action/rule combination as well as the actions and rules themselves are only for illustrative purposes and one skilled in the art would construe them broadly and not limiting. In FIG. 5A a screen shot 500 includes data fields 510 with each data field including a textual entry 550. The data fields are defined as individual data fields 512–542. A mouse pointer 502 is located over data field 526. Upon performing an action, such as depressing the Ctrl key and clicking on the mouse button, a particular data field and a rule are identified (i.e. data field 526 and copy). The results of this operation are shown in FIG. 5B with a copy action-icon 505 displayed within data field 526. Next, upon actuating the icon such as clicking on the mouse in the center of data field 526, the rule identified is applied to a selection group of data fields 518, 534 and 542, in this example, the copy rule. The results of this operation are shown in FIG. 5C with data fields 518, 534 and 542 having the same contents as 526. Note that the action-icon 505 remains displayed; however, it can be removed from display.

Figure 5D:
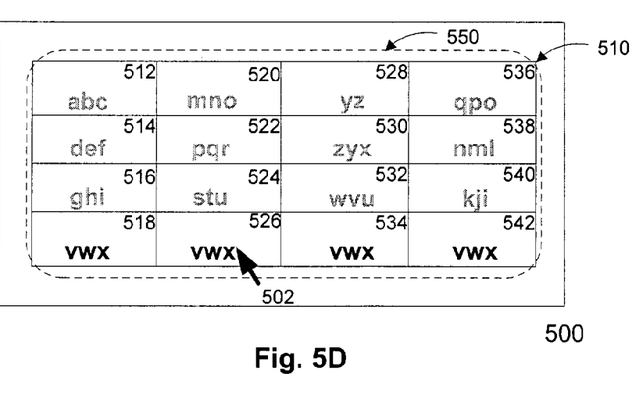
Figure 5E:
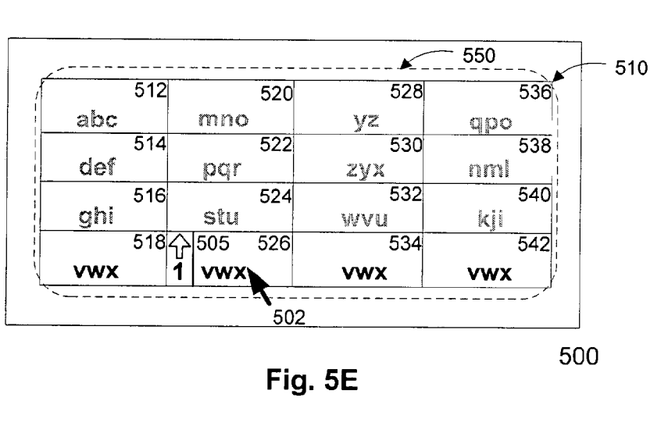
Figure 5F:
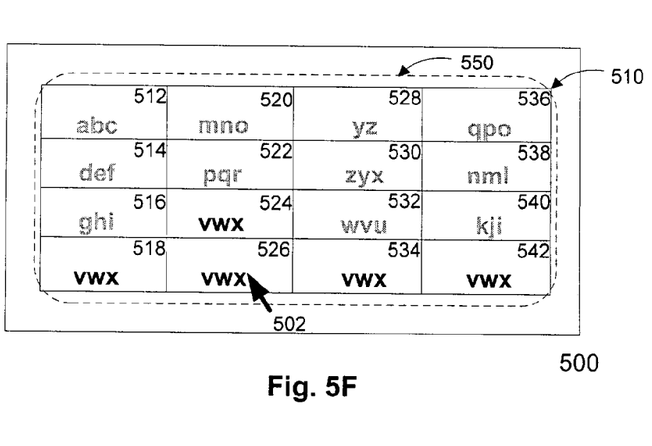

FIG. 5D shows another example. In this example, a mouse pointer 502 is located over data field 526. Upon performing an action such as depressing the Alt key and clicking mouse button, a particular data field and a rule are identified (i.e. data field 526 and copy). The results of this operation are illustrated in FIG. 5E with a copy action icon 505 displayed within data field 526. Next, upon actuating the icon such as clicking on the mouse in the upper right portion of data field 526, a rule associated with the type of selector is invoked, in this example, the copy rule. The results of this operation are shown in FIG. 5F with data field 524 having the same contents as 526. Note that in this example action-icon 505 is removed, however, in other embodiments it can remain on the display.

One skilled in the art will appreciate that the application of the present invention can take many forms and functions and the examples provided herein are only used to illustrate a few of these possibilities. The scope of the present invention is not limited by these examples.

Although this disclosure describes our invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for modifying data fields displayed by a computer program running a markup language interface, comprising the steps of:

displaying a plurality of data fields within the markup language interface;

receiving an input, wherein said input defines an action selector and a data field selected from at least one of said plurality of data fields;

displaying an action-icon at or near said data field, said action-icon being applicable to a particular subset of data fields having a relationship with the selected data field, the particular subset of data fields is determined based on the location of a pointer indicator within the selected data field;

receiving an actuation of the action-icon; and applying the action to the particular subset of data fields.

2. A method for applying operations on one or more of at least one displayed area in a markup language environment, the method comprising the steps of:

displaying a plurality of data fields within the markup language interface;

receiving a particular input;

determining an action associated, at least in part and at least on a portion of the particular input;

determining a particular subset of data fields having a relationship with the selected data field, based at least in part, and at least on a portion of the particular input, the particular subset of data fields is determined based on the position of a pointing device cursor within the selected data field;

displaying an action-icon in the vicinity of said data field, said action-icon providing an indication of the action and the relationship of the particular subset with the selected data field;

receiving an execution request; and applying the action to the particular subset of data fields.

* * * * *